May 6, 1941.  A. BESTELMEYER  2,240,750
RATE OF CLIMB INDICATOR
Filed May 12, 1938
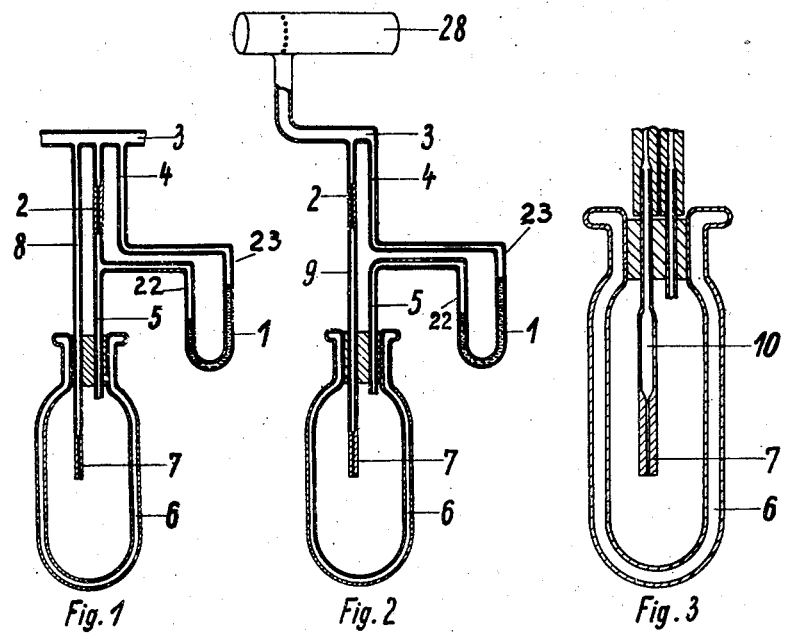
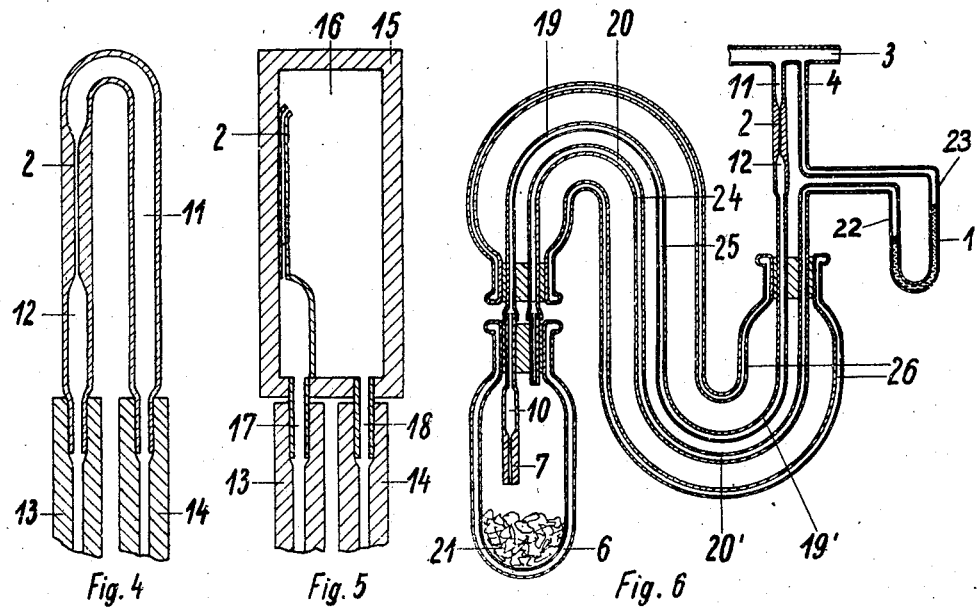
Inventor:
Adolf Bestelmeyer
By A. S. Adams
Attorney Patented May 6, 1941

2,240,750

UNITED STATES PATENT OFFICE 2,240,750

RATE OF CLIMB INDICATOR

Adolf Bestelmeyer, Berlin-Zehlendorf, Germany, assignor to Askania-Werke A. G. vormals Centralwerkstatt - Dessau und Carl Bamberg-Friedenau, a corporation of Germany Application May 12, 1938, Serial No. 207,627
In Germany March 30, 1937

13 Claims. (Cl. 73—179)

The present invention relates to rate of climb indicators.

The rate of climb indicator for measurement of the speed of rise or fall of aircraft is based on the principle of measuring the pressure difference between the free atmosphere and a closed air volume (heat insulated reservoir) which communicates with the free atmosphere through a flow-resistance (capillary), the effectiveness of which depends on the internal friction of the air. Whilst the indicator, with the same constant temperature of the atmosphere, closed air volume and flow-resistance, provides at each air pressure an indication which depends only essentially on the percentage speed of variation of the air pressure, the same indicator exhibits different values, if the said temperatures are not equal or likewise vary during the air pressure variation.

Attempts to remove the temperature dependence of the indicator indication have previously failed, since only a part of the temperature influences coming into consideration were considered. Thus in a known arrangement the influence which the variation of the viscosity of the air at different absolute temperatures exerts on the indication was taken into account in that the flow-resistance was rendered temperature-dependent in such manner that with temperature reduction, therefore with decreasing viscosity of the air, the flow-resistance increases.

In contrast to this it is proposed according to the present invention to render the indicator independent of variations in the temperature of the closed air volume and of the flow- resistance as well as of those of the temperature of the free atmosphere. Thereby the influence of a temperature variation of the atmosphere, closed air volume and flow-resistance on the indicator can be strongly repressed. Calculation shows that this can be achieved by maintaining the flow-resistance at a mean temperature between the temperature of the closed air volume and the temperature of the free atmosphere. For example one half of the flow-resistance can be maintained always at the same temperature as the closed air volume and the other half always at the same temperature as the external air. For this purpose the flow resistances may comprise separate resistances connected either in series or in parallel. In this case a part constituting one-half of the total resistance is subjected to the temperature of the closed air volume while the other half of the total resistance is subjected to the temperature of the outside atmosphere. An advantageous construction is achieved in that one-half of the flow-resistance is mounted in the closed air volume of a heat insulated reservoir ("thermos" bottle) usually provided for increasing the closed air volume and the other half is under the direct action of the temperature of the free atmosphere.

It is recommended to provide before each half of the flow-resistance a heat exchanger which brings the flowing air, before entry into the flow-resistance, to the temperature thereof. For this purpose part of an air supply conduit passing through the wall of the heat insulated reservoir and serving as heat exchanger can be provided before the half of the flow-resistance mounted in said reservoir. Furthermore a part of an air supply conduit serving as heat exchanger can be provided at each side of the half of the flow-resistance which is under the direct action of the temperature of the external air. Thereby it is ensured, in the case of flow of the air towards the "thermos" bottle as well as away from the "thermos" bottle, that the following air before entry into the flow-resistance has already assumed the temperature thereof.

When taking the measures described the enclosed air volume is to be protected against sudden temperature variations. This can be achieved by a good heat insulation and if desired by increasing the heat capacity of the closed air volume. The heat insulation of the main part of the closed air volume is preferably effected in known manner by employment of a vessel having double walls having the space between the walls evacuated forming a "thermos" bottle. The increase of the heat capacity can be achieved by the incorporation of material of great heat capacity, for example by the insertion of crumpled metal foil. Thereby there can be given to this part of the closed air volume such a heat inertia that the temperature variation of the enclosed air volume, brought about by the unavoidable supply and removal of heat and the pressure variation thereby caused, remains negligible with respect to the air pressure difference to be measured. Furthermore the temperature exchange within the "thermos" bottle is effected faster than if material of great heat capacity is not provided.

In the same way as for the main part of the closed air volume it is of value to achieve as good heat insulation as possible for the residue of the air volume still remaining in the supply conduits, which as a rule are rubber conduits, and in the indicating instrument.

Through the walls of these parts heat may in fact be imparted from outside to the air volume enclosed in these parts. As a result of this heat transfer by convection may take place from the conduits and pressure indicating means to the air enclosed in the heat insulated reservoir. The indicating error thereby caused can be considerably reduced by keeping the enclosed air volumes located outside the "thermos" bottle as small as possible. Moreover, it is recommended to insulate these volumes as well as possible. A particularly good heat insulation of the connecting conduits can for example be achieved by incorporating the connecting conduits in double-walled evacuated vessels or tubes. The heat exchange can furthermore be made more difficult by keeping the connecting conduits of the two flow-resistances which are at different temperatures as well as the connection of the "thermos" bottle with the indicating instrument as small in cross-sectional area as is possible without substantially influencing the indication. The lower limit for the internal width of the connecting conduits is given in that the flow-resistance of the connecting conduits must be small with respect to the flow-resistance of the capillary. It has been found advantageous for the internal width of the supply conduits to be so small that the flow-resistance of these conduits lies within the limits of 0.1% to 10% of the capillary resistance.

In order to prevent the exchange of the temperature of the air in the connecting conduits and in the "thermos" bottle, if the pressures of the interior of the "thermos" bottle and of the free atmosphere are equal, i. e. during horizontal flight of the aircraft, syphon-like pipe-members may be incorporated in the connecting conduits, the function of which being described with reference to the drawing.

In order that the present invention may be well understood some embodiments thereof will now be described by way of example with reference to the accompanying drawing, the details of the instrument which are of common practice being omitted.

Fig. 1 is a transverse section of a rate of climb indicator according to the invention having two capillaries connected in parallel.

Fig. 2 is a transverse section of a modified form of a rate of climb indicator having two capillaries connected in series.

Fig. 3 is a transverse section showing a heat exchanger and a capillary combined into a unit and incorporated in a thermally insulated reservoir.

Fig. 4 shows in transverse section a capillary combined with two heat exchangers into a unit, the unit being under the direct action of the temperature of the external air.

Fig. 5 shows another modification of an assembly illustrated in Fig. 4.

Fig. 6 shows the insertion of siphon-like pipe members between the capillaries of the indicator and between the differential pressure meter and the interior of the heat insulated reservoir.

Like parts are designated by the same reference numerals.

Fig. 1 shows a rate of climb indicator according to the invention. I is a differential pressure means of a well-known type for instance an U-formed tube partly containing liquid, the levels of which forming the indicating means. The shank 22 of the tube communicates in usual manner with a passage 3 by means of a capillary tube 2, said passage being connected to a static atmospheric pressure source 28, e. g. a speed indicator of a well-known type, as Fig. 2 shows. The shank 23 of the U-formed tube directly communicates with the passage 3 and therefore with the static atmosphere by means of the conduit 4. Capillary tube 2 is maintained at the temperature of the external air. Communicating with the part 22 by means of the conduit 5 is a heat insulated air reservoir 6 usually provided for increasing the air volume enclosed in said part and being protected against the influences of changes in temperature by a double-walled covering. Another capillary tube 7 is mounted within said air reservoir, the tube 7 communicating with the passage 3 by means of the conduit 8. Therefore, the capillary tube 7 is maintained always at the same temperature as the air enclosed in the heat insulated reservoir 6. The liquid is subjected to the differential pressure between the atmosphere and the interior of the heat insulated reservoir 6 and as the two capillaries 2 and 7 are connected in parallel through both capillary tubes 2 and 7 the air flows from or to the interior of the reservoir 6, if the aircraft carrying the instrument starts to climb. The capillary tube 2 being one half of the whole flow-resistance and the capillary tube 7 being the other half, the flow-resistance is maintained at a mean temperature between the temperature of the closed air volume and the temperature of the outside atmosphere.

Fig. 2 shows a rate of climb indicator having two capillaries 2 and 7 connected in series by means of the conduit 9 and lying between the interior of the passage 3 subjected to static atmospheric pressure and the interior of the part 22 and the interior of the heat insulated vessel 6, respectively. The part 23 again communicates with the passage 3 by means of the conduit 4 and the part 22 with the interior of the heat insulated reservoir 6 through the conduit 5.

Fig. 3 shows, combined into a unit with a capillary 7, a heat exchanger 10 in the form of a pipe member of relatively great internal width, intended for incorporation in a "thermos" bottle taking up the great part of the closed air volume. The heat exchanger has the temperature of the interior of the "thermos" bottle. The air which flows to the "thermos" bottle assumes the temperature of the interior of the "thermos" bottle upon flowing through the enlarged pipe member 10.

Fig. 4 shows the capillary 2 to the two sides of which are connected pipe members 11, 12 respectively serving as heat exchangers. The parts combined into a unit are under the direct action of the temperature of the free atmosphere and on this account assume this temperature. In the case of an aircraft for example they are led out of the aircraft fuselage. To the heat exchangers 11, 12 are connected the connecting conduits 13, 14 for example preferably rubber conduits, of which the one (14) leads to the place in the aircraft from which the static external air pressure is taken and the other of which (13) is led to the interior of the "thermos" bottle. If the air flowing to the capillary 2 from the place at which the static air pressure prevails has a temperature other than the external temperature, then upon flowing through the pipe member 11 it will be brought to the temperature of the capillary 2. If air flows from the "thermos" bottle to the capillary 2, then this air before flowing through the capillary 2 will also be brought to the temperature of the capillary by the pipe member 12 likewise serving as a heat exchanger.

Fig. 5 which is an equivalent to the structure of Fig. 4 shows another form of construction of the heat exchanger connected to each side of the capillary 2. In a closed metallic box 15 is located a small capillary pipe 2 metallically connected with the housing. The one end of this capillary opens into the interior 16 of the box 15, whilst the other end of the capillary communicates with an outlet 17 from the housing 15. Likewise there is a further outlet 18 from the housing 15. To the two outlets are again connected as previously the rubber conduits 13, 14 of which one (14) is led to the place at which the static air pressure prevails and the other of which (13) is in communication with the interior of the "thermos" bottle.

Fig. 6 shows an arrangement similar to that illustrated in Fig. 2. The special construction of this figure is that the two capillary tubes 2 and 7 on the one hand and the air-filled shank 22 of the differential pressure meter 1 and the interior of the "thermos" bottle 6 on the other hand are connected each by a conduit, respectively. Each conduit having curved syphon-like parts 19, 19' and 20, 20' connected by vertical parts 24, 25, respectively. These conduits are enclosed in a double-walled evacuated pipe 26 in order to effect good heat insulation of the connecting conduits. In like manner the connecting conduits can also be protected against temperature influences. The connecting conduits are to be constructed as narrow as possible. If, for example, the internal width of the connecting conduits (rubber tubes) is 2 mm. then 1 m. of such a tube has only 0.2% of the resistance of a capillary of 0.2 mm. diameter and 5 cm. length. In the interior of the "thermos" bottle 6 is inserted a crumpled metal foil 21 for increasing the heat capacity of the bottle. In this figure are also illustrated the heat exchangers 10, 11, 12, respectively, assembled in the manner illustrated in Figs. 3 and 4.

If the pressures in the interior of the "thermos" bottle and of the outside atmosphere are equal, the curved syphon-like parts prevent streaming of air from the connecting conduits to the interior of the "thermos" bottle caused by temperature influences of the air enclosed in these parts. Assuming that the air in the connecting conduits is colder than the air in the "thermos" bottle, then, if syphon-like members are not provided as it is the case in arrangements according to Figs. 1 and 2, cold air due to its greater density will sink and enter the interior of the "thermos" bottle. If, however, syphon-like members are used, this is prevented, because the cold air remains in the lower curved parts 19', 20' due to its density and cannot ascend to the upper curved parts 19, 20. Therefore, a temperature variation and therewith a pressure variation in the "thermos" bottle is prevented when flying horizontally through layers of different temperature.

Having now particularly described and ascertained the nature of my said invention and in what manner the same is to be performed, I declare that what I claim is:

1. A rate of climb indicator comprising, in combination, a closed air volume, a flow-resistance by means of which said closed air volume is in communication with the atmosphere; a member being responsive to differential pressures between the interior of said chamber and the atmosphere; a part consisting of one-half of the total flow-resistance mounted in the closed air volume, whilst the other half of the total flow-resistance is subjected to the temperature of the outside atmosphere.

2. A rate of climb indicator comprising, in combination, a closed air volume, a flow-resistance by means of which said closed air volume is in communication with the atmosphere; a member being responsive to differential pressures between the interior of said chamber and the atmosphere, the flow-resistance comprising separate resistances connected in series; a part consisting of one-half of the total flow-resistance mounted in the closed air volume, whilst the other half of the total flow-resistance is subjected to the temperature of the outside atmosphere.

3. A rate of climb indicator comprising, in combination, a closed air volume, a flow-resistance by means of which said closed air volume is in communication with the atmosphere; a member being responsive to differential pressures between the interior of said chamber and the atmosphere; the flow-resistance comprising separate resistances connected in parallel; a part consisting of one-half of the total flow-resistance mounted in the closed air volume, whilst the other half of the total flow-resistance is subjected to the temperature of the outside atmosphere.

4. A rate of climb indicator comprising, in combination, a closed air volume, a flow-resistance by means of which said closed air volume is in communication with the atmosphere; a member being responsive to differential pressures between the interior of said chamber and the atmosphere; a part consisting of one-half of the total flow-resistance mounted in the closed air volume, whilst the other half of the total flow-resistance is subjected to the temperature of the outside atmosphere; heat exchanging means being connected to each part of said flow resistance for changing the temperature of the air prior to entry into said parts of the resistance to the temperature thereof.

5. A rate of climb indicator as claimed in claim 4, in which is connected to the part of said total flow-resistance mounted in the interior of said enclosed air volume an air supply conduit passing through the wall of said enclosed air volume, said air supply conduit serving as a heat exchanger.

6. A rate of climb indicator as claimed in claim 4, in which there is connected to each side of said part of the total flow-resistance subjected to the temperature of the atmosphere a part of an air supply conduit serving as a heat exchanger which is likewise subjected to the temperature of the external air.

7. A rate of climb indicator comprising, in combination, a chamber containing air, a capillary flow-resistance by means of which said chamber is in communication with the atmosphere, a member being responsive to differential pressures between the interior of said chamber and the atmosphere, a heat insulated reservoir connected to said chamber; a part constituting one half of the total flow-resistance being mounted in said heat insulated reservoir, whilst the other half of the total resistance is subjected to the temperature of the outside atmosphere; the heat capacity of said heat insulated reservoir being increased by the incorporation of additional material of great heat capacity.

8. A rate of climb indicator as claimed in claim 7, in which the additional material is in the form of crumpled metal foil inserted in the interior of the heat insulated reservoir.

9. A rate of climb indicator as claimed in claim 7, in which the conduits connecting the interior of said heat insulated reservoir with said chamber and the atmosphere, respectively are enclosed by double-walled evacuated vessels or tubes.

10. A rate of climb indicator as claimed in claim 7, in which the conduits connecting the interior of said heat insulated reservoir with said chamber and the atmosphere, respectively, are enclosed by double-walled evacuated vessels or tubes and in which the cross-section of said connecting conduits are maintained so small that the flow-resistance of said conduits lies within the limits of 0.1% to 10% of said capillary flow-resistance.

11. A rate of climb indicator comprising, in combination, a chamber containing air, a capillary flow-resistance by means of which said chamber is in communication with the atmosphere, a member being responsive to differential pressures between the interior of said chamber and the atmosphere; a part constituting one half of the total flow-resistance being mounted in said heat insulated reservoir, whilst the other half of the total resistance is subjected to the temperature of the outside atmosphere; syphon-like conduits being incorporated in the conduits connecting the interior of said heat insulated reservoir with said chamber and the atmosphere, respectively, for impeding the stream of air from said connecting conduits to the interior of said heat insulated reservoir caused by temperature differences of the air enclosed in these parts when the pressure in the interior of said reservoir and that of the atmosphere are equal.

12. A rate of climb instrument comprising, in combination, a chamber, an air volume within said chamber, a flow resistance connecting said chamber with the outer atmosphere, and indicating means responsive to the difference between the pressure of the air within said chamber and that of the atmosphere, said flow resistance including temperature sensitive capillary means subjected to the temperature of the air volume in said chamber and a second temperature sensitive capillary means subjected to the temperature of the outer atmosphere, both of said capillary means tending to correct errors in the indication of said instrument caused by variations in temperature of the air volume in said chamber and of the outer atmosphere respectively.

13. A rate of climb instrument comprising, in combination, a chamber having an air volume therein, a flow resistance connecting said chamber with the outer atmosphere, and indicating means responsive to the difference between the pressure of the air within said chamber and that of the atmosphere, said flow resistance having a capillary tube in the air volume and a capillary tube influenced by the outer atmosphere whereby the temperature of the flow resistance represents the average of the temperature within the chamber and that of the outer atmosphere.

ADOLF BESTELMEYER.